(12) United States Patent
Hanssen et al.

(10) Patent No.: US 11,920,995 B2
(45) Date of Patent: Mar. 5, 2024

(54) DRIVE SHAFT MONITORING SYSTEM

(71) Applicant: Kongsberg Maritime AS, Horten (NO)

(72) Inventors: Stefan Blom Hanssen, Trondheim (NO); Morten Fagerli, Ranheim (NO)

(73) Assignee: Kongsberg Maritime AS, Horten (NO)

( * ) Notice: Subject to any disclaimer, the term of this patent is extended or adjusted under 35 U.S.C. 154(b) by 9 days.

(21) Appl. No.: 17/618,928

(22) PCT Filed: Jun. 25, 2020

(86) PCT No.: PCT/NO2020/050179
§ 371 (c)(1),
(2) Date: Dec. 14, 2021

(87) PCT Pub. No.: WO2020/263104
PCT Pub. Date: Dec. 30, 2020

(65) Prior Publication Data
US 2022/0244116 A1 Aug. 4, 2022

(30) Foreign Application Priority Data

Jun. 28, 2019 (NO) .................................. 20190818

(51) Int. Cl.
*G01L 3/08* (2006.01)
*G01L 27/00* (2006.01)
*G01M 15/05* (2006.01)

(52) U.S. Cl.
CPC .............. *G01L 3/08* (2013.01); *G01L 27/002* (2013.01); *G01M 15/05* (2013.01)

(58) Field of Classification Search
CPC . G01L 3/08; G01L 27/002; G01L 3/24; G01L 3/10; G01L 3/12; G01L 5/12;
(Continued)

(56) References Cited

U.S. PATENT DOCUMENTS 4,875,379 A * 10/1989 Rohs ........................ G01L 3/109
73/862.327
5,001,937 A * 3/1991 Bechtel ..................... G01L 3/12
73/862.324
(Continued)

FOREIGN PATENT DOCUMENTS

| CN | 102901596 A | 1/2013 |
| CN | 103900747 A | 7/2014 |

(Continued)

OTHER PUBLICATIONS

Zappala, D. et al., "Non-intrusive torque measurement for rotating shafts using optical sensing of zebra-tapes," Meas. Sci. Technol. 29, 065207, pp. 1-18 (2018).

(Continued)

*Primary Examiner* — Freddie Kirkland, III
(74) *Attorney, Agent, or Firm* — Alix, Yale & Ristas, LLP

(57) ABSTRACT

Drive shaft monitoring system has a first and second coded disc. The first and second coded disc are provided with multiple slots or recesses evenly distributed in circumferential direction thereof. The drive shaft monitoring system includes at least two independent light sensor assemblies arranged in connection with the slots or recesses of the first and second coded disc.

22 Claims, 9 Drawing Sheets

Change of pulse pattern from unloaded to loaded condition

(58) Field of Classification Search
CPC .......... G01L 5/13; G01L 5/166; G01M 15/05; G01H 1/006; G01H 9/00; G01H 1/00; G01H 7/00

See application file for complete search history.

(56) References Cited

U.S. PATENT DOCUMENTS

| | | | |
|---|---|---|---|
| 5,247,839 A * | 9/1993 | Okutani | G01L 3/109 |
| | | | 73/862.324 |
| 5,253,531 A | 10/1993 | Walker et al. | |
| 5,537,874 A * | 7/1996 | Akahane | G01P 15/0888 |
| | | | 73/514.04 |
| 5,918,286 A | 6/1999 | Smith et al. | |
| 6,679,126 B2 * | 1/2004 | Dalton | G01L 3/12 |
| | | | 73/862.324 |
| 7,559,258 B2 * | 7/2009 | Matzoll | G01L 3/12 |
| | | | 73/862.08 |
| 7,784,364 B2 * | 8/2010 | Matzoll | G01L 3/12 |
| | | | 73/800 |
| 8,024,956 B2 * | 9/2011 | Hammerschmidt | G01D 5/145 |
| | | | 73/1.41 |
| 8,077,301 B2 * | 12/2011 | Al-Rawi | G01D 5/3473 |
| | | | 356/138 |
| 9,176,024 B2 * | 11/2015 | Jensen | F01D 17/02 |
| 10,641,127 B2 * | 5/2020 | Kestering | G01P 3/26 |
| 11,313,245 B2 * | 4/2022 | Hill | F01D 21/003 |
| 2003/0010137 A1 * | 1/2003 | Dalton | G01L 3/12 |
| | | | 73/862.324 |
| 2005/0044968 A1 | 3/2005 | Southward | |
| 2015/0107342 A1 | 4/2015 | Jensen et al. | |

FOREIGN PATENT DOCUMENTS

| | | |
|---|---|---|
| CN | 109506816 A | 3/2019 |
| EP | 3343192 A1 | 7/2018 |

OTHER PUBLICATIONS

International Search Report and Written Opinion dated Jul. 27, 2020 for International Patent Application No. PCT/NO2020/050179.

Extended European Search Report dated Jan. 13, 2023 for European Patent Application No. 20833296.5.

* cited by examiner

Change of pulse pattern from unloaded to loaded condition

DRIVE SHAFT MONITORING SYSTEM

BACKGROUND

The disclosed embodiments relate to a drive shaft monitoring system, and especially to a monitoring system for a rotating drive shaft.

The closest prior art is found in WO96/10167. In WO96/10167 is described an apparatus intended for measuring of the torque of rotating shafts for the purpose of calculating the shaft power. The solution is based on one single light signal being transmitted and received by a single channel in a processing unit. The light signal is sent from a light source via optical fiber in a circle passing through the air gap of an optical U-shaped element fixed near a first code wheel and further via the optical fiber and passing through the air gap of an optical U-shaped element fixed near a second code wheel, before received in a receiver and forwarded to a processing unit. By using small teeth and large openings and position the code wheels relative to each other so that the teeth of one code wheel is in the opening of the other the light signal could be interrupted independently by teeth of the two code wheels. I.e. all edges and their relative position (changing with twist) were visible to the system. The time displacement between the vanes/teeth on the two discs/gearwheels is a measure on the shaft torque, enabling the shaft power to be calculated in the computer.

The mentioned solution suffer from several disadvantages. Firstly, by using only one sensor per code wheel the accuracy would be poor if sensor foundations move in relation to the shaft, which will be a situation that is typical for a vessel.

Secondly, large openings result in few teeth and poor resolution, and further results in that torsional analysis is not possible.

Thirdly, the solution suffer from critical installation requirements, especially by that the relative position of the code wheels, where no overlap is allowed. This results in that it will be challenging to get correct installation due to only a small acceptance window.

Fourthly, the solution suffer from that the distance between the code wheels are restricted by the size of openings in the code wheel (relative to twist), resulting in a limitation of achieved accuracy.

Fifthly, the solution suffer from poor accuracy (even though claimed otherwise) and missing torsional vibration makes it impossible to offer drive shaft monitoring.

Further, the use of light beam and optical fibre is challenging as regards both service and installation, as this requires special equipment and competence in the fibre optic area.

From EP0635120B1 is known an optical system for monitoring vibration, particularly applicable to power shafts in rotating power systems. The system comprises an optical unit including IRLED radiation sources aimed at grid lines applied around the circumference of the shaft. The reflection of the radiation is imaged through lenses and a matching Ronchi grid onto a photodiode, which produces a periodic wave signal from which indications of rotational irregularities can be derived. In one embodiment, duplicate radiation sources and imaging apparatus are arranged in diametric oppositions across the shaft to permit compensation for pitch and plunge shaft vibration. In another preferred embodiment, a second, duplicate optical unit is located at a distance along the shaft from the first unit. The output signals of the two units are passed through a comparator and an EX-NOR gate, then low-pass filtered to produce a signal indicative of torsional deflection. Quadrature techniques can be used to provide shaft directional information.

Drawbacks of this solution is, among others, that there is required a photolithographic process to arrange the grid lines on the shaft. This requires precision, as well as it requires personnel with specialized training to be able to perform this.

Further, the use of such grid lines on a shaft to provide a coded pattern suffer from that they are exposed to dirt and dust, something that will considerably reduce the accuracy of the system and could result in failure of correct measurements.

The solution is further not easy to repair or exchange if damaged, as this would require personnel with specialized training. For e.g. maritime vessels, sailing such specialized personnel is usually not a part of the crew. This would leave the system out of operation until the maritime vessel again arrives at a port.

A further drawback of this solution is that it cannot be dismounted and remounted at pulling of the shaft. For marine vessels it is regularly required to remove intermediate shafts/drive shafts such that the propeller shaft can be pulled out for inspection of bearings and sealing. During this operation all protection caps are removed, which could result in damage of shaft when it is lifted or pulled, and thus also damaging the coded pattern that cannot be repaired by others than specialized personnel.

Visual inspection and/or troubleshooting of the system is difficult as this will require special equipment and specialized personnel.

A severe disadvantage with the solution of EP0635120B1 is that the resolution decreases at high RPM and large diameter, with considerably limitations to adapt the solution to systems with high RPM and large diameter shafts.

The solution is further not arranged to take into consideration movement of the sensors due to movement of the structure they are arranged to, which is common for maritime vessels, as well as compensation for this movement.

In EP 3343192 A1 is described an optical torque sensor for measuring a torque on a rotating system having a shaft. The optical torque sensor comprises two wedge prisms arranged to an input portion and an output portion of the shaft. Furthermore, a light source is arranged to emit a light beam through the wedge prisms toward an optical position sensor, which is arranged to receive the light beam and configured to provide a position signal indicative of a position of an incident light spot in the optical position sensor. The optical torque sensor further has control circuitry configured to receive the position signal and to determine a torque value applied to the input portion based on this position signal. The solution of EP 3343192 A1 also suffer from most of the disadvantages mentioned for EP0635120B1 and WO96/10167 and thus not provide a solution to the mentioned disadvantages.

A further disadvantage with the mentioned prior art solutions is that they do not provide an accurate crankshaft monitoring. As the prior art systems fail to provide an accurate crankshaft monitoring they can further not provide a signal for a control unit of a motor/engine. The solution further also lack a trigger that may inform that the shaft has rotated one rotation, which is a strict requirement if used for measuring over a motor/engine.

The prior art solutions cannot be used for monitoring over motor/engine together with an incremental encoder as the measurement signal from one optical measurement unit cannot be separated and used. The prior art solutions further lack track of angle between cranks, as they lack a trigger that may inform of a starting point (missing tooth trigger).

Another disadvantage with the mentioned prior art solutions is that they do not provide clutch slip detection.

It is also a disadvantage of the mentioned prior art solutions that they are not arranged for measuring axial displacement and thrust forces of a shaft.

SUMMARY

Provided herein is a drive shaft monitoring system partly or entirely solving the mentioned lacks and drawbacks of prior art systems.

The disclosed drive shaft monitoring system enables increased accuracy of measurements compared to prior art solutions.

The disclosed drive shaft monitoring system provides measurement of torsional angle, torque and shaft power.

The disclosed drive shaft monitoring system provides shaft deflection and eccentricity measurements.

The disclosed drive shaft monitoring system provides detection of shaft vibrations and torsion oscillations.

The disclosed drive shaft monitoring system provides clutch slip detection.

The disclosed drive shaft monitoring system provides measurement of axial displacement and thrust forces induced by device (e.g. a propeller of a vessel) connected to the drive shaft.

The disclosed drive shaft monitoring system, when used in combination with the axially installed incremental crank angle encoder fixed to a free end of an engine/motor, can provide measurement of twist and torsional vibrations also over the crank shaft of the engine.

The disclosed embodiments are related to a drive shaft monitoring system comprising a first and second coded disc arranged to exterior surface of a drive shaft or section of a drive shaft. The first coded disc is arranged at a first position of the drive shaft or section of the drive shaft and the second coded disc is arranged at a second position of the drive shaft or section of the drive shaft, wherein the second position is at a predetermined distance from the first coded disc in longitudinal direction of the drive shaft or section of the drive shaft.

The first and second coded disc are provided with multiple slots or recesses evenly distributed in circumferential direction thereof, enabling light to pass through the coded discs and be blocked by the coded discs in the areas between the slots or recesses that form teeth.

The drive shaft monitoring system comprises at least two independent light sensor assemblies for each of the first and second coded disc, arranged in connection with the mentioned slots or recesses.

According to a further embodiment of the drive shaft monitoring system a first light sensor assembly is arranged at a first circumferential position of the respective coded disc and a second light sensor assembly is arranged at a second circumferential position of the respective coded disc, wherein the second circumferential position is at a predetermined distance from the from the first light sensor assembly in circumferential direction of the respective coded disc, such that the first and second light sensor assembly are arranged laterally reversed about the respective coded disc and thus aligned on a transversal axis through centre of the respective coded disc, i.e. arranged diametrically opposed across the drive shaft.

According to an embodiment of the drive shaft monitoring system the light sensor assemblies comprise a light source emitting a light beam in a perpendicular plane to the multiple slots or recesses at one side of the respective coded disc and an electro-optical sensor for receiving modulated light through the multiple slots or recesses arranged at other side of the respective coded disc.

In accordance with a further embodiment of the drive shaft monitoring system, it comprises at least one high-resolution incremental encoder that is arranged in connection with the respective coded disc for calibration purpose. During calibration of the respective coded disc, the high-resolution incremental encoder will provide a pulse train replacing time-triggered pulses made by an internal clock of the processing unit for calculating slot/recess offset t during calibration and determination of zero point for twist (torque). The zero point for twist is given by the two coded discs relative position at zero torque. The high-resolution incremental encoder thus provides a high-resolution pulse train when the drive shaft is rotated slowly. At slow rotation of the velocity changes will be so large that one cannot assume that the velocity is constant through a tooth window (An−An+1) and one can thus not use the clock counter of the processing unit as reference, requiring the use of a high-resolution incremental encoder. When the drive shaft is rotated at operational rotational speed one may assume that the velocity through a tooth window (An−An+1) is constant, and that the high-resolution incremental encoder is thus not required after the calibration process is completed.

In this manner, one may build a table in the processing unit containing information of relative positions, that will be used for further processing and monitoring.

In a calibration process, the rising and falling pulse edges of the mentioned multiple slots or recesses are detected and wherein the results are combined into a fraction. By allowing this fraction to represent as small part of the mentioned coded discs as possible, one may assume that the angular velocity is constant.

The first light sensor assembly will detect a pulse related to a slot or recess in question by $A_n$ and the next slot or recces by $A_{n+1}$, wherein $A_{n+1} - A_n = 1$, wherein the second light sensor assembly will detect a pulse for the same slot or recess by $B_n$ and the next slot or recces by $B_{n+1}$, wherein $B_{n+1} - B_n = 1$ for the first coded disc, as shown in upper time series in FIG. 1, where P+ is rising pulse edge and P− is falling pulse edge.

Similarly, the first light sensor assembly will detect a pulse related to a slot or recess in question by $C_n$ and the next slot or recces by $C_{n+1}$, wherein $C_{n+1} - C_n = 1$, wherein the second light sensor assembly will detect a pulse for the same slot or recess by $D_n$ and the next slot or recces by $D_{n+1}$, wherein $D_{n+1} - D_n = 1$ for the second coded disc.

By combining and averaging the measurements from the first and second light sensor assembly for each of the first and second coded disc, one will get the following calibrated fraction for the respective slot or recess n for raising pulse edge:

$$F_{calibrated\ raising\ pulse\ edge} = \frac{AB_{n+1} - CD_n}{AB_{n+1} - AB_n}$$

Similar fraction $F_{calibrated\ falling\ pulse\ edge}$ is registered for falling pulse edges for the respective slot or recess n. Accordingly, all of the multiple slots or recesses are registered in a mapped table as relative fractions for raising and falling pulse edges, related to the pulses of the incremental encoder, that all other light sensor assembly events are compared with.

Accordingly, the mentioned relative fractions change as the process values change. In this manner, the drive shaft monitoring system provides a measurement system that is independent of time factors.

According to a further embodiment of the drive shaft monitoring system it comprises a third light sensor assembly positioned between the first and second light sensor assemblies, at same distance from both the first and second light sensor assemblies in circumferential direction of the respective coded disc.

According to a further embodiment of the drive shaft monitoring system, the third light sensor assembly is arranged to observe the slots or recesses of the coded discs with an angle deviating from perpendicular, such as e.g. 30-45 degrees.

The drive shaft will have a longitudinal motion caused by thrust forces induced by e.g. a propeller vs. the hull. Such forces typically make thrust bearings and the drive shaft to compress or stretch. It is a relatively small movement compared to the twist. Longitudinal motion can be detected by the third light sensor assembly arranged with an angle to the slots or recesses of the coded disc. The pulses from this light sensor assembly is compared to 90° angled light sensor assemblies that should not observe the same movement. Deviations are likely caused by compression or stretch, but needs a very accurate detection. By the disclosed embodiments, it is possible to achieve a relatively correct indication of this within a certain time span.

It will be preferable that the processing unit for this is provided with adjustable parameters in order to calibrate such a detection to a known or estimated thrust from torque and propeller diameter.

According to a further embodiment of the drive shaft monitoring system the light sensor assemblies are arranged in a mounting bracket assembly formed by a mainly U-shaped sensor holder body, wherein the light source is arranged at one side of the U-shaped sensor holder body and the electro-optical sensor is arranged at the other side of the U-shaped sensor holder body, accordingly laterally reversed and aligned to a common measurement axis in transversal direction of the mainly U-shaped sensor holder body. The U-shaped sensor holder body is adapted to receive an outer part of the coded disc with a gap therebetween and positioning the light source and electro-optical sensor in correspondence with the slots or recesses of the respective coded disc, allowing the coded disc to rotate with the mentioned slots or recesses in the mainly U-shaped sensor holder body in alignment with the measurement axis of the light sensor assemblies.

In accordance with a further embodiment of the drive shaft monitoring it comprises a support structure positioning the light sensor assemblies in relation to the respective coded disc and the drive shaft without any contact with the coded disc and drive shaft, and which attach the light sensor assemblies to an object structure the drive shaft is attached to.

The drive shaft monitoring system accordingly provides a digital measuring system for detection of drive shaft twist, drive shaft RPM (Revolutions per minute) as well as transferred torque and power of the drive shaft.

The drive shaft monitoring system comprises a processing unit provided with means and/or software for calculation of drive shaft twist and thereby drive shaft torque based on time shift in the modulated signals.

The coded discs, as they are rotated due to rotation of the drive shaft, results in that they act as rotating pulse modulating discs that the transmitted light beam from the light source will pass, resulting in a great number of pulses for each turn of the drive shaft or section of the drive shaft. The displacement of the slots or recesses and thus the teeth formed between the slots or recesses in the first and second coded disc determine the pulse width, which is a measure of the torsional angle, torque and drive shaft power.

The mutual position of the coded discs are uncritical as to whether the drive shaft monitoring system will work, but they are normally arranged in a position where the modulated pulses from the second coded disc fall within the modulated pulses from the first coded disc, e.g. where a reference slot or recess of the second coded disc is displaced 90 degrees about the circumference of the drive shaft in relation to a reference slot or recess of the first coded disc.

RPM (Rotations Per Minute) may be calculated by measuring overall speed of the slots/recesses or teeth in the respective coded disc, which may be achieved by counting clock pulses of one turn of the drive shaft.

When the drive shaft is unloaded there will be time displacement t between slots/recesses or teeth of the first and second coded disc, as shown in FIG. 1 upper time series. When the drive shaft is loaded this time displacement will increase to t+Δt, where Δt express the torsion angle, as shown in FIG. 1 lower time series.

The light signals received by the respective electro-optical sensor generate width modulated electronic pulses, wherein the pulse width modulation is generated by measuring the time between raising pulse edges and between falling pulse edges.

The time series of modulated pulses from rising and falling edges are accumulated in the processing unit for further processing.

The sum of the time duration from the time series is averaged and updated at suitable number of turns of the drive shaft or at desired time intervals.

By calculating the above-described fractions for each slot or recess n at the current situation:

$$F_{calibrated\ raising\ pulse\ edge} = \frac{AB_{n+1} - CD_n}{AB_{n+1} - AB_n}$$

and similarly $F_{current\ falling\ pulse\ edge}$.

The $F_{current\ raising\ pulse\ edge}$ and $F_{current\ falling\ pulse\ edge}$ are compared to the $F_{calibrated\ raising\ pulse\ edge}$ and $F_{calibrated\ falling\ pulse\ edge}$, respectively, and further averaging the result for raising and falling pulse edges wherein the result is a measure of the torsion angle (Δt), or devAng.

The averaged torsion angle, the measured RPM and the knowledge of steel parameters of the drive shaft make it possible to calculate torque and shaft power.

Rotation direction must be detected by using the reference slot or recess, also known as missing tooth trigger. The slot or recess number must remain the same in both revolution directions, meaning that the slot or recess count will go down when the shaft is operated in reverse. Rising pulse edge forward will become falling pulse edge in reverse. To understand which edge we are at, the system needs to invert the naming convention of rising and falling pulse edges when changing the turning direction.

By using the average of rising and falling pulse edges registered by the first and second light sensor assembly this will eliminate some of the problems when changing direction, but may result in loss of resolution.

Definitions

| Name | Symbol | Quantity |
|---|---|---|
| Power | P | Watt, W [= Newton * meter/sec] |
| Torque | T | Nm [= Newton * meter] |
| Rotational speed | N | RPM, revolutions per minute |
| Rotational speed | $\omega_{rad}$ | RADIAN/SEC |
| Twist angle | $\alpha_{rad}$ | RADIAN, RAD |
| Polar moment of Inertia | I | $m^4$ |
| Outer Diameter | Do | m |
| Inner Diameter | Di | M |
| G-modulus | G | Pascal [= Newton/$m^2$] |
| Length | L | M |
| Frequency | F | Hertz [1/s] |
| Number of slots per coded disc | Z | Slots |
| π (Pi) | π | 3.14259 |
| K factor (User gain) | K | Value of −1 to 1 |
| Offset factor (User offset) | P | Nm [= Newton * meter] |

Formulas to be used in the processing unit:

| Basic formulas | Derived formulas |
|---|---|
| I = π ($Do^4$ − $Di^4$)/32 | T = α * G * I/L |
| ω = 2 π * f | P = (G * I * L) * α * ω |
| d = N/60 | |
| P = T * ω | |
| A = T * L/(G * I) [α in radians] | |
| α = 2π * devAng | |

Based on this the torque may be calculated by the processing unit by the using the formula:

$$T+O=(2\pi*devAng)*(G*I*K)/L$$

The power may be calculated by the processing unit by using the formula:

$$P=2\pi*RPM*Torque/60$$

The factors G, I, L and Z are configured into the system by an administrator. K and O are user variables, reachable by a user interface. The factor devAng, and RPM are measured by the processing unit based on input from the light sensor assemblies.

The twist of the drive shaft or section of the drive shaft may be calculated by the processing unit using the following formula:

$$\alpha_{tot}=(T*L)/(G*I)=T/G*L/I$$

If a drive shaft is formed by shaft sections of different diameter, e.g. smaller diameter at both sides of a joint, there will be a total length of "thin area" of $L_1=L_{1a}+L_{1b}$.

Total twist can be divided into two; twist for "thin" area and twist for "wide" area:

$$\alpha_{tot}=\alpha_1+\alpha_2=T*L_1/(G*I_1)+T*L_2/(G*I_2), \text{which results in}$$

$$=T/G*(L_1/I_1+L_2/I_2)$$

$$=T/G*((L_1*I_2+L_2*I_1)/(I_1*I_2))$$

To find the correct value for $I_{outer\ only}$ of various diameter:

$$I_{outer\ only}=(L_1*I_1+L_2*I_2)/L$$

$$I_{outer\ only}=Do^4*\pi/32$$

$$Do=(I_{outer\ only}*32/\pi)^{1/4}$$

$$Do_{mean}=((L_1*I_1+L_2*I_2)/L*32/\pi)^{1/4}$$

The drive shaft monitoring system enables shaft deflection and eccentricity measurement by using at least two independent light sensor assemblies for each coded disc. By using at least two independent light sensor assemblies, i.e. at least the first and second light sensor assemblies, for each coded disc this enables shaft deflection and eccentricity measurement in the Y-axis.

By using at least three light sensor assemblies, i.e. the first, second and third light sensor assemblies, wherein the third light sensor assembly is arranged to observe the slots of the coded discs with an angle deviating from perpendicular, such as e.g. 30-45 degrees, shaft deflection and eccentricity measurements in X- and Y-plane may be performed, as shown in FIGS. 7A-7C. The third light sensor assembly is used for measurement in longitudinal direction (Z-axis) of the drive shaft or X-, Y-axis.

The processing unit is arranged to calculate orbit deviation for each coded disc.

The processing unit starts with calculating the approximate devAngle between the first and second sensor assembly for each coded disc compared to calibrated devAngle. The processing unit further calculates the devAngle into an actual orbit offset from a calibrated value for each coded disc.

The shaft deflection is calculated by:

$$D=\frac{(Shaft\ \emptyset)+100}{2}\mathrm{Cos}\left(\left(1-\frac{C1}{2C}\right)\pi\right)$$

Wherein shaft Ø=shaft diameter, C=½ circumference reference normal, i.e. calibrated, and C1=½ circumference reference with deflection, as shown in FIG. 7B for the first and second light sensor assembly.

The circumference or respective part of the circumference is found by means of using the registered pulse signals from the first and second light sensor assembly to determine change in distance between the first and second light sensor assembly on a respective part of the circumference of the drive shaft. By means known diameter and appropriate formulas, a change in center point of the drive shaft may be determined. At change of respective part of the circumference due to displacement in relation to the measurement points of the first and second light sensor assembly, the number of time units a given point on the drive shaft uses for moving from measurement point of the first light sensor assembly to the measurement point of the second light sensor assembly will be changed, which may be used for determining the changed path/circumference C1 of the drive shaft, which may be used in the formula for the shaft deflection.

When a third light sensor assembly is used in addition to the first and second light sensor assembly, the result is three measurement axes that will have to be combined to X- and Y-axis.

The orbit offset is accordingly analysed per slot or recess, in similar manner as the torsion angle analysis, described above.

Accordingly, enabling and providing a measure of:
1. Detect deflection—The values has travelled too far into plus or minus direction
2. Detect shaft vibration—The peak2peak values is too high Accordingly, this information may be provided by that the processing unit calculates:
Orbit offset peak2peak for the first coded disc,
Orbit offset peak2peak for the second coded disc,
Mean orbit offset for the first coded disc,
Mean orbit offset for the second coded disc,
This information may be used to provide an orbit warning, as well as present preliminary views for X+Y deviation combined, or only Y-plane, as shown in FIG. 7C.

The third light sensor assembly is used as input for calculation of sum offset.

According to a further embodiment of the drive shaft monitoring system it is arranged to detect clutch slip, which is a function that may be activated by a user when desired.

The detection of clutch slip requires that the drive shaft monitoring system comprises an engine flywheel sensor providing input to the processing unit or is arranged to receive data from an existing engine flywheel sensor.

The processing unit is further required to have:
a configuration parameter for how many teeth is picked up by the flywheel sensor,
a configuration parameter for gear ratio, if gear is present between flywheel and drive shaft,
a configuration parameter for warning level.

The clutch slip is detected by that the processing unit is provided with means and/or software for comparing RPM on the flywheel, provided by the flywheel sensor and on the drive shaft provided by the drive shaft monitoring system as described above, after taking into account the gear ratio.

Gear ratio is calculated by: RPM Engine/RPM drive shaft=Gear ratio, which provides an initial or designed gear ratio.

The present gear ratio is calculated by:

Present gear ratio=RPM Engine(measured by flywheel sensor)/RPM drive shaft(measured by drive shaft monitoring system).

Clutch slip may then be calculated by comparing the initial or designed gear ratio with present gear ratio, wherein the clutch slip may be presented for a user as a %-deviation from nominal gear ratio by:

Clutch slip=(Initial or designed gear ratio/present gear ratio)*100−>100−calculated clutch slip=clutch slip value in %.

If the absolute value is higher than a pre-set threshold, the drive shaft monitoring system should provide a warning to the user.

The calculated clutch slip is preferably also stored in a database and shown in the trend views, which may be used for detecting clutch creep.

The calculated orbit, torque, clutch slip and similar may be used as input to a control system for the drive shaft.

According to a further embodiment the drive shaft monitoring system is arranged for combining the readings from the second (foremost) coded disc with an incremental encoder fixed to the free end of an engine powering the drive shaft for measuring twist/torque and torsional vibrations also over a crankshaft of the engine, in this way providing a crankshaft monitoring system.

Most large bore diesel engines equipped with automatic tuning system need a high-resolution crank angle encoder to control combustion timing in the best possible way. This is normally solved by installing an incremental encoder to the centre of the free end of the crankshaft. Resolution may typically be 1080/rotation. For this purpose, standard available incremental encoders may be used.

Due to the length of the crankshaft, it will twist significantly at high load. The assumed twist must be known to the tuning system in order to calculate correct timing for each cylinder. The load dependent twist at TDC (Top Dead Center), i.e. upper piston position, is calculated and/or confirmed at shop test for each cylinder.

There is however so that once connected to clutch, shaft, gear, generator and propeller, the pattern of torsional vibrations of the drive shaft changes the behaviour of the engine and the stress applied to the crankshaft. This can be seen in the twist. It is therefore desirable to monitor the twist of crankshaft in order to:
perform correct tuning of the engine cylinders,
avoid high loads on the crankshaft,
detect operating modes with high torsional vibrations (that should be avoided).

This may also be achieved by providing an output of the second (foremost) coded disc, i.e. raw data, to an engine control system for processing, solving the same purpose.

The measurement signal from the second coded disc will be very similar to a measurement system from an existing incremental encoder arranged to the motor/engine.

Further preferable features and advantageous details of the disclosed embodiments will appear from the following example description, claims and attached drawings.

BRIEF DESCRIPTION OF THE DRAWINGS

The present invention will below be described in further detail with reference to the attached drawings, where.

DETAILED DESCRIPTION

Figure 1:
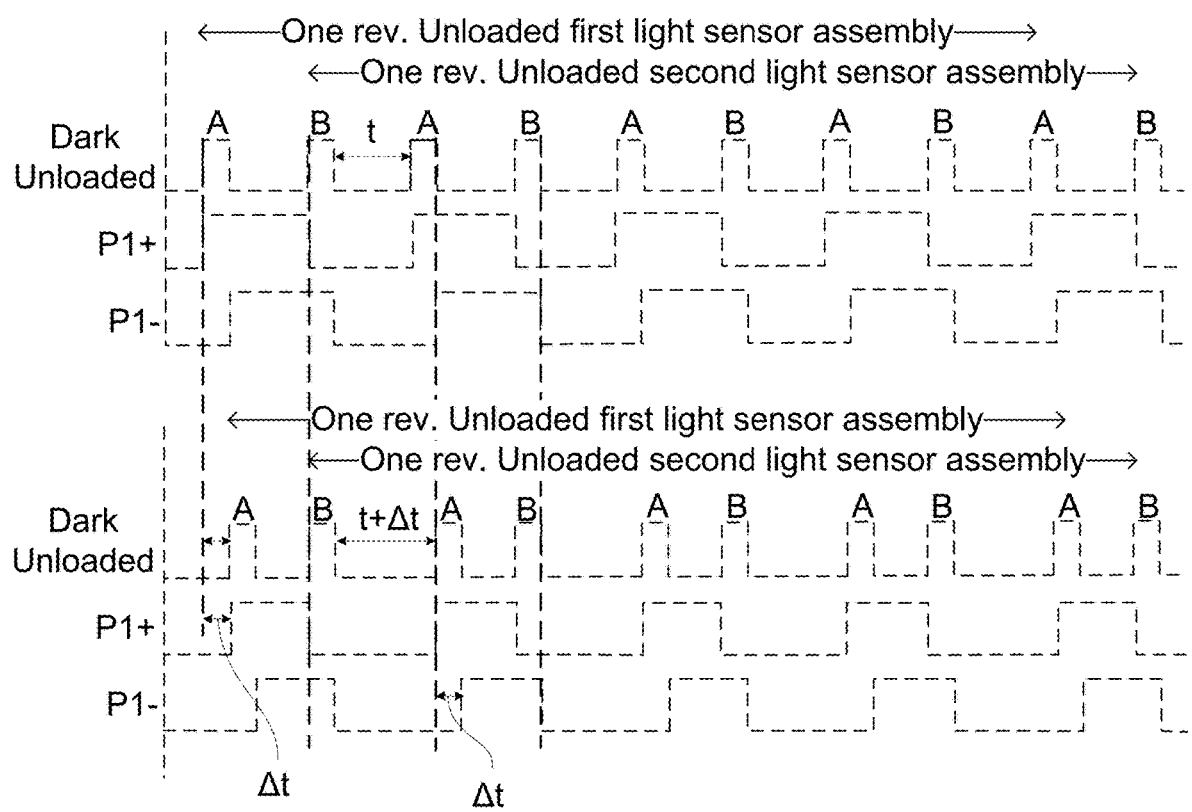
FIG. 1 is a principle drawing of pulse patterns of a light sensor assembly according to the disclosure.
Figure 2:
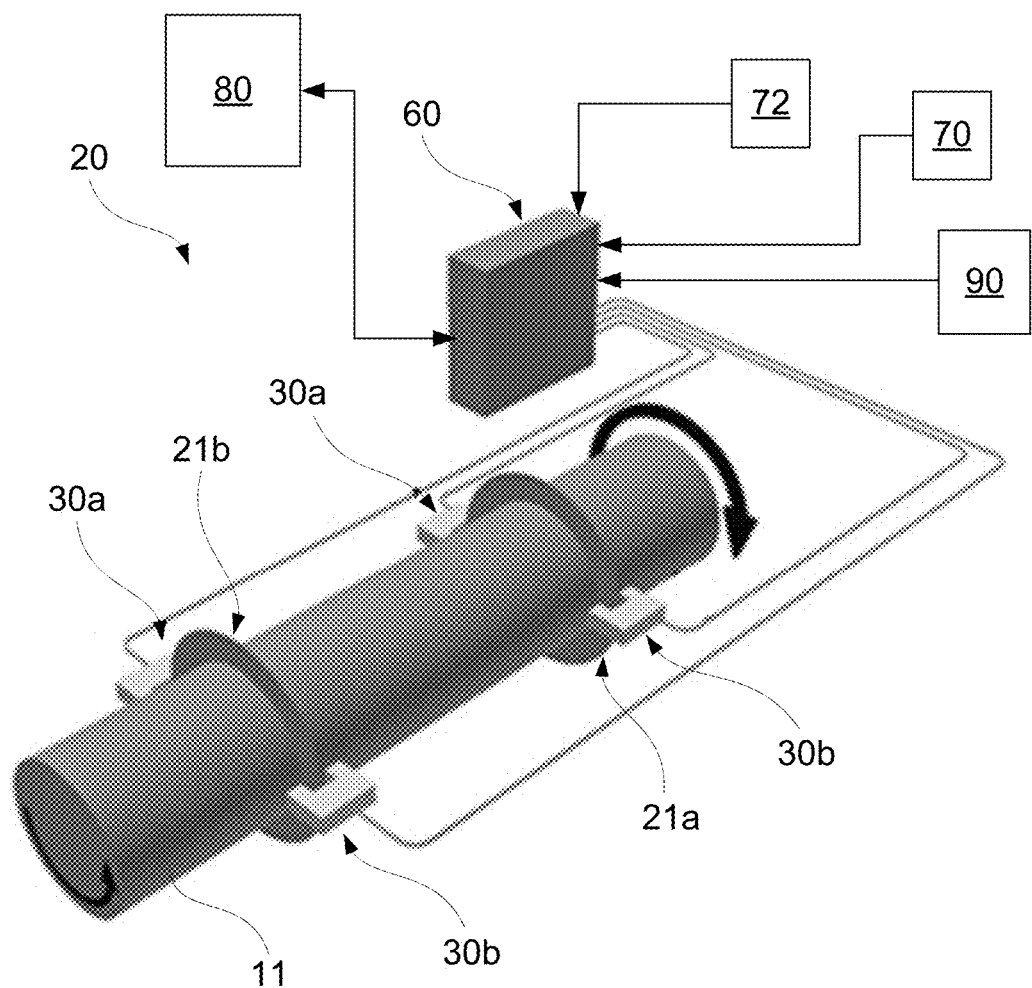
FIG. 2 is a principle drawing of a drive shaft monitoring system according to the disclosure.

Reference is now made to FIG. 2 showing a principle drawing of a drive shaft monitoring system 20 according to a first embodiment.

The disclosed drive shaft monitoring system 20 comprises a first coded disc 21a arranged to exterior surface of the drive shaft 11 at a first position and a second coded disc 21b arranged to exterior surface of the drive shaft 11 at a second position, wherein the second position is at a predetermined distance from the first coded disc 21a in longitudinal direction of the drive shaft 11. The first 21a and second 21b coded disc are accordingly displaced in longitudinal direction of the drive shaft 11. The first 21a and second 21b coded disc are provided with multiple slots or recesses 22 (FIG. 3) evenly distributed in circumferential direction thereof to provide a coded disc 21a-b, enabling light to pass through the coded discs 21a-b and be blocked by the coded disc in the areas between the slots or recesses 22 that form teeth.

The drive shaft monitoring system 20 further comprises at least two independent light sensor assemblies 30a-b arranged in connection with the first 21a and second 21b coded disc.

In the embodiment shown in FIG. 2 the drive shaft monitoring system comprises a first light sensor assembly 30a arranged at a first position in relation to the respective coded disc 21a-b and a second light sensor assembly 30b arranged at a second position in relation to the respective coded disc 21a-b, wherein the second position is at a predetermined distance from the from the first light sensor assembly 30a in circumferential direction of the respective coded disc 21a-b, such that the first 30a and second 30b light sensor assembly are arranged laterally reversed about the coded disc 21a-b and thus aligned on a transversal axis through centre of the coded disc 21a-b, i.e. at an angle of 180 degrees about the respective coded disc 21a-b.

Figure 4A:
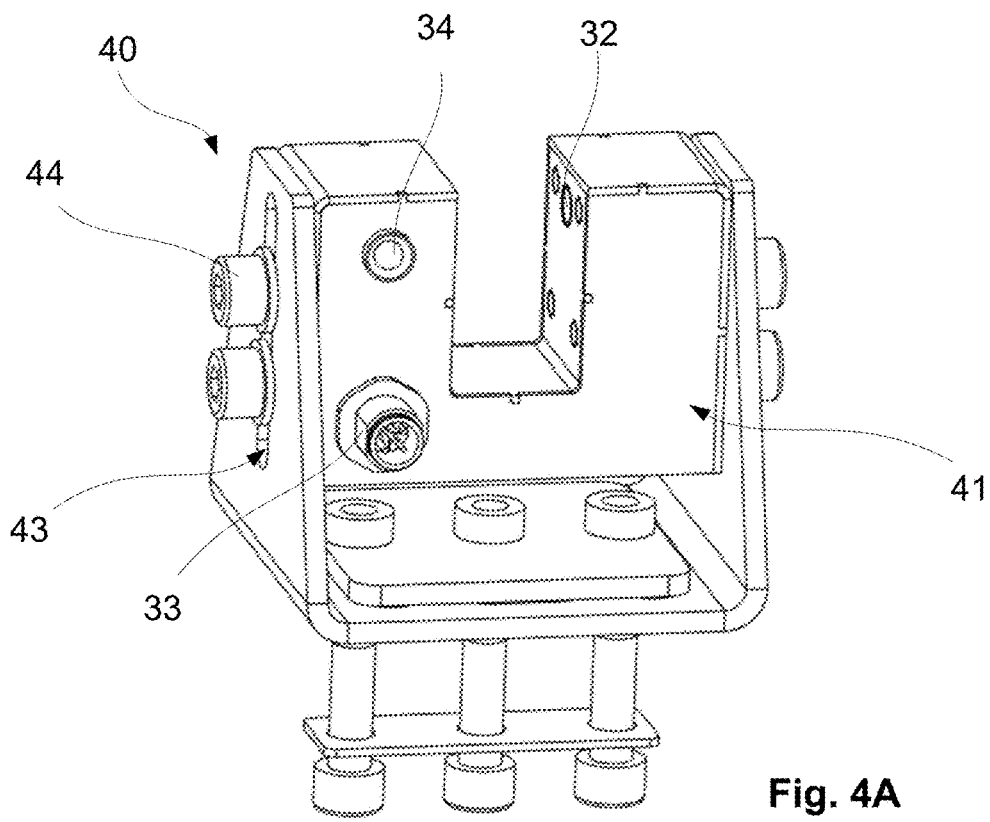
FIGS. 4A and 4B are principle drawing of a light sensor assembly according to the disclosure.
Figure 4B:
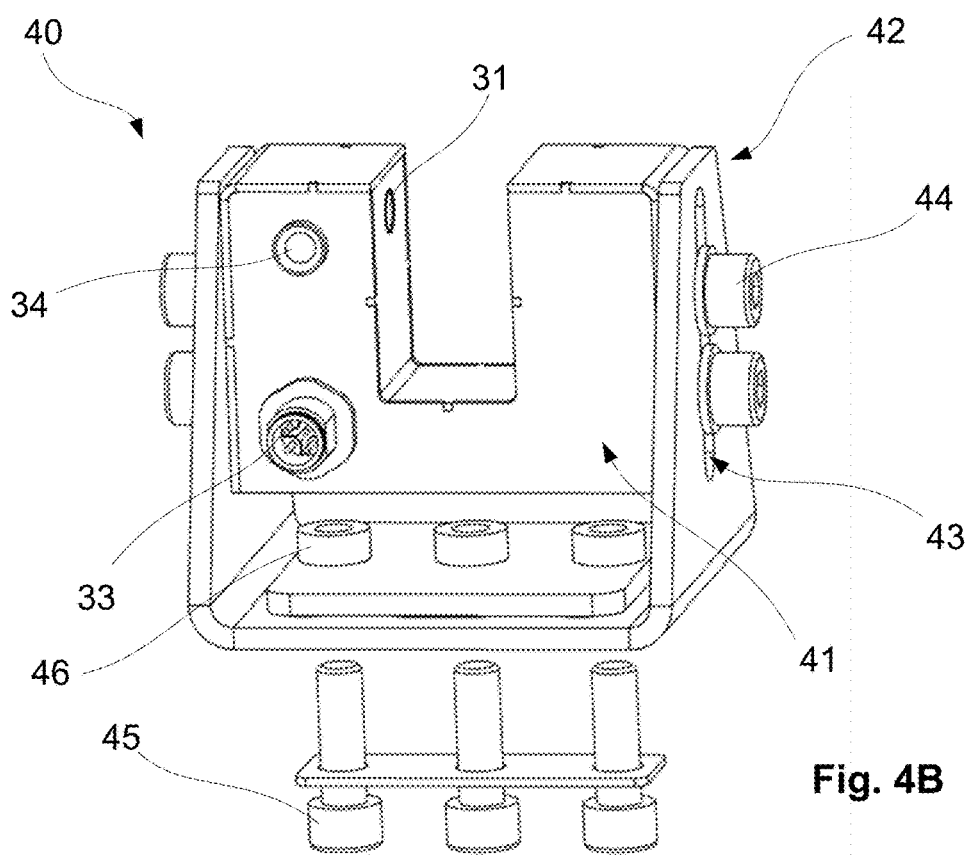

The first 30a and second 30b light sensor assembly comprise, as shown in FIGS. 4A and 4B, a light source 31, such as a laser or LED (Light Emitting Diode), emitting a light beam in perpendicular plane to the multiple slots or recesses 22 at one side of the respective coded disc 21a-b and an electro-optical sensor 32 for receiving modulated light through the multiple slots or recesses 22 arranged at other side of the respective coded discs 21a-b.

Figure 3:
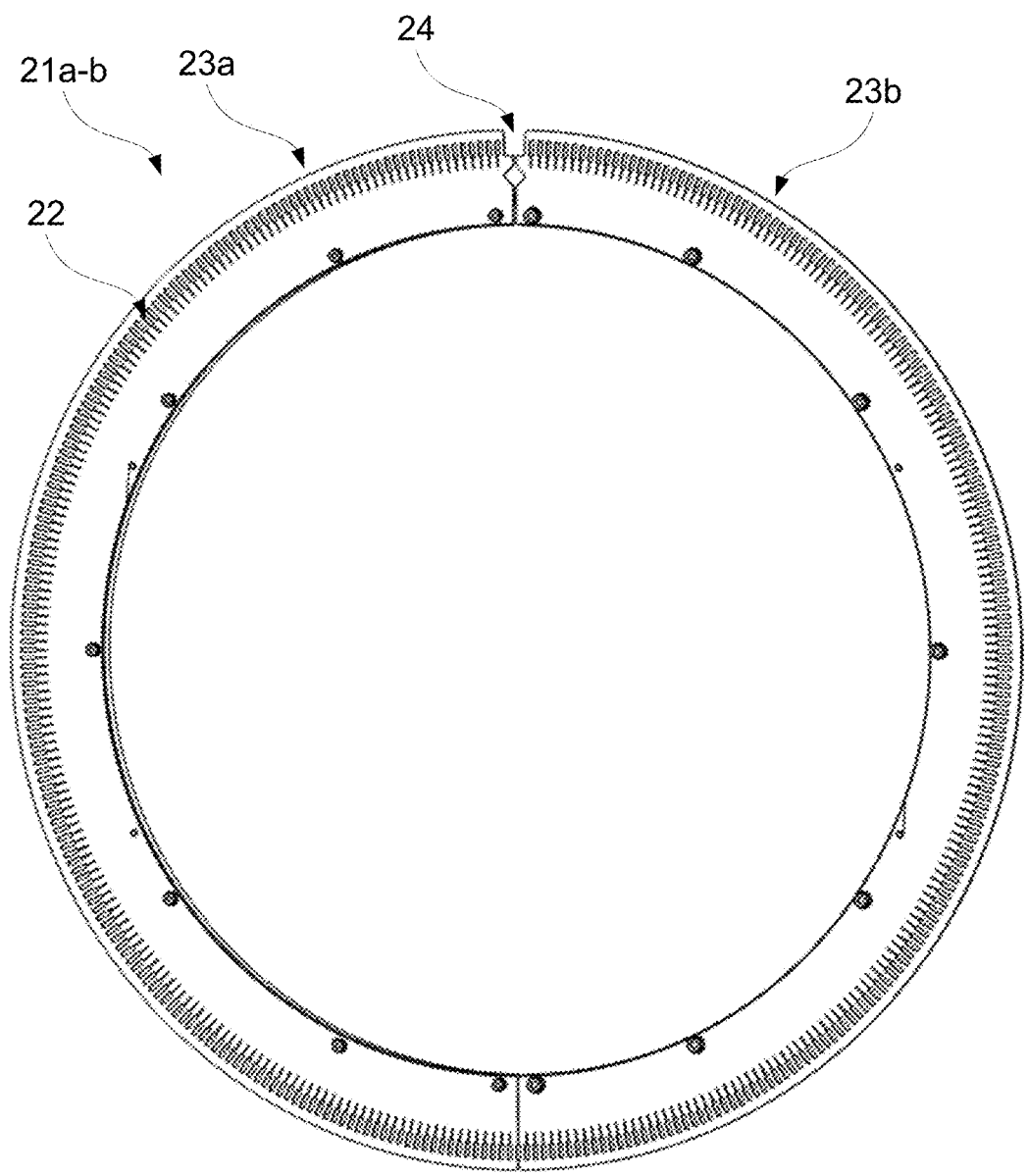
FIG. 3 is a principle drawing of a coded disc according to the disclosure.

An example of a coded disc 21a-b is shown in FIG. 3. The coded disc 21a-b may be formed by several parts 23a-b that are assembled to form a complete coded disc 21a-b. In the shown example, there are shown two halves 23a-b that are connected together by appropriate fastening means (not shown). As mentioned above the coded disc 21a-b is further provided with multiple slots or recesses 22 evenly distributed in circumferential direction of the coded disc 21a-b, at a distance from the exterior circumference of the coded disc 21a-b. According to a preferable embodiment of the coded disc 21a-b, the slots or recesses 22 are mainly rectangular and extending with the longitudinal direction thereof in transversal direction of the coded disc 21a-b. According to an alternative embodiment, the rectangular slots or recesses 22 are extending with the longitudinal direction in circumferential direction of the coded disc 21a-b.

As will be further described below it is important that sides extending in transversal direction of the slots or recesses 22 are precise to ensure enhanced detection. It should further be mentioned that the more slots or recesses 22 the higher resolution in the measurements system is achieved. The coded disc 21a-b is further preferably provided reference slot 24 arranged at exterior circumference of the coded disc 21a-b. The reference slot 24 is preferably mainly rectangular and extends with its longitudinal direction from the exterior circumference of the coded disc 21a-b and to the same extension as the mentioned slots or recesses 22 in transversal direction of the coded disc 21a-b. The reference slot 24 thus provides a gap in the series of slots or recesses 22 that will be used as a reference for the light sensor assemblies 30a-b that the coded disc 21a-b has rotated 360 degrees, i.e. one revolution.

The interior diameter of the coded disc 21a-b corresponds to the outer diameter of the drive shaft 11 and is provided with attachment means (not shown), such as a clamp device, for secure attachment to the drive shaft 11 or section of the drive shaft 11, and when attached to the drive shaft 11 or section of the drive shaft 11 the coded disc 21a-b extends perpendicularly on the longitudinal axis of the drive shaft 11, positioning the mentioned slots or recesses 22 at a distance (offset) from the exterior surface of the drive shaft 11 and thus divides the drive shaft 11 into slots or recesses 22.

According to the shown embodiment of FIG. 3, the size of the slots or recesses 22 will typically be between 5-10 mm in longitudinal direction and 2-6 mm in width direction. As general design rules, the number of slots or recesses 22 should provide at least:

360 teeth per code disc half 23a-b for a drive shaft with a diameter>350 mm,
180 teeth per code disc half 23a-b for a drive shaft with a diameter>100 mm,
90 teeth per code disc half 23a-b for a drive shaft with a diameter<100 mm.

Further, the spacing, i.e. teeth, between the mentioned slots or recesses 22 in the coded disc 21a-b in the shown embodiment corresponds to the width of the mentioned slots or recesses 22. As a general requirement it will be required that the spacing, i.e. teeth, between the slots or recesses 22 is large enough for the electro-optical sensor 32 to detect absence light, i.e. interruption of the light beam from the light source 31, to be able to provide an on/off light pulse pattern. Due to each coded disc 21a-b is provided with a reference slot 24 a moving target tracker is provided.

For the alternative where the slots or recesses 22 extend with their longitudinal direction in circumferential direction of the coded disc 21a-b, the spacing, i.e. teeth, between the slots or recesses 22 will not correspond to the width of slots or recesses 22, but will be large enough for the light to be interrupted to provide the on/off light pulse pattern.

The coded disc 21a-b accordingly divides the drive shaft 11 into slots or recesses 22/teeth that may be used by the light sensor assembly 30a-b to measure properties thereof, which will be further described below.

Reference is now made to FIGS. 4A and 4B showing principle drawings of a mounting bracket assembly 40 for the light sensor assembly 30a-b. The mounting bracket assembly 40 is formed by a mainly U-shaped sensor holder body 41, wherein the light source 31 is arranged at one side of the U-shaped sensor holder body 41 and the electro-optical sensor 32 is arranged at the other side of the U-shaped sensor holder body 41, accordingly laterally reversed and aligned to a common measurement axis in transversal direction of the mainly U-shaped sensor holder body 41.

The height and width of the interior circumference of the U-shaped sensor holder body 41 is adapted the coded disc 21a-b, such that the U-shaped sensor holder body 41 may be arranged to receive an outer part of the coded disc 21a-b with a gap therebetween and positioning the light source 31 and electro-optical sensor 32 in correspondence with the mentioned slots or recesses 22 of the respective coded disc 21a-b, allowing the coded disc 21a-b to rotate with the mentioned slots or recesses 22 in the mainly U-shaped sensor holder body 41 in alignment with the measurement axis of the light sensor assembly 30a-b. The gap of the U-shaped sensor holder body 41 is must be large enough to allow the drive shaft 11 to twist/deflect without the coded disc 21a-b coming in contact with the U-shaped sensor holder body 41. The light sensor assembly 30a-b is accordingly arranged such that the measurement axis thereof is perpendicular to the rotational axis of the coded disc 21a-b, accordingly in a parallel longitudinal axis of the longitudinal centre axis of the drive shaft 11.

The U-shaped sensor holder body 41 is further provided with a connection 33 for power and signal transfer to the mentioned light source 31 and electro-optical sensor 32. The U-shaped sensor holder body 41 may further be provided with a light status indicator 34, such as a LED, indicating the status of the light sensor assembly 30a-b.

The mounting bracket assembly 40 further comprises a U-shaped attachment bracket 42 adapted for accommodating and attachment of the U-shaped sensor holder body 41 interior thereof. The U-shaped attachment bracket 42 is further provided with longitudinal slots 43 at longitudinal sides thereof. The U-shaped sensor holder 41 is arranged adjustable in longitudinal direction of the U-shaped attachment bracket 42 by means of corresponding attachment means. According to the shown embodiment the U-shaped sensor holder body 41 is provided with threaded holes (not shown) at exterior longitudinal sides thereof for receiving attachment screws 44 extending through the longitudinal slots 43 enabling adjustment of the U-shaped sensor holder body 41 in longitudinal direction of the U-shaped attachment bracket 42.

Figure 5:
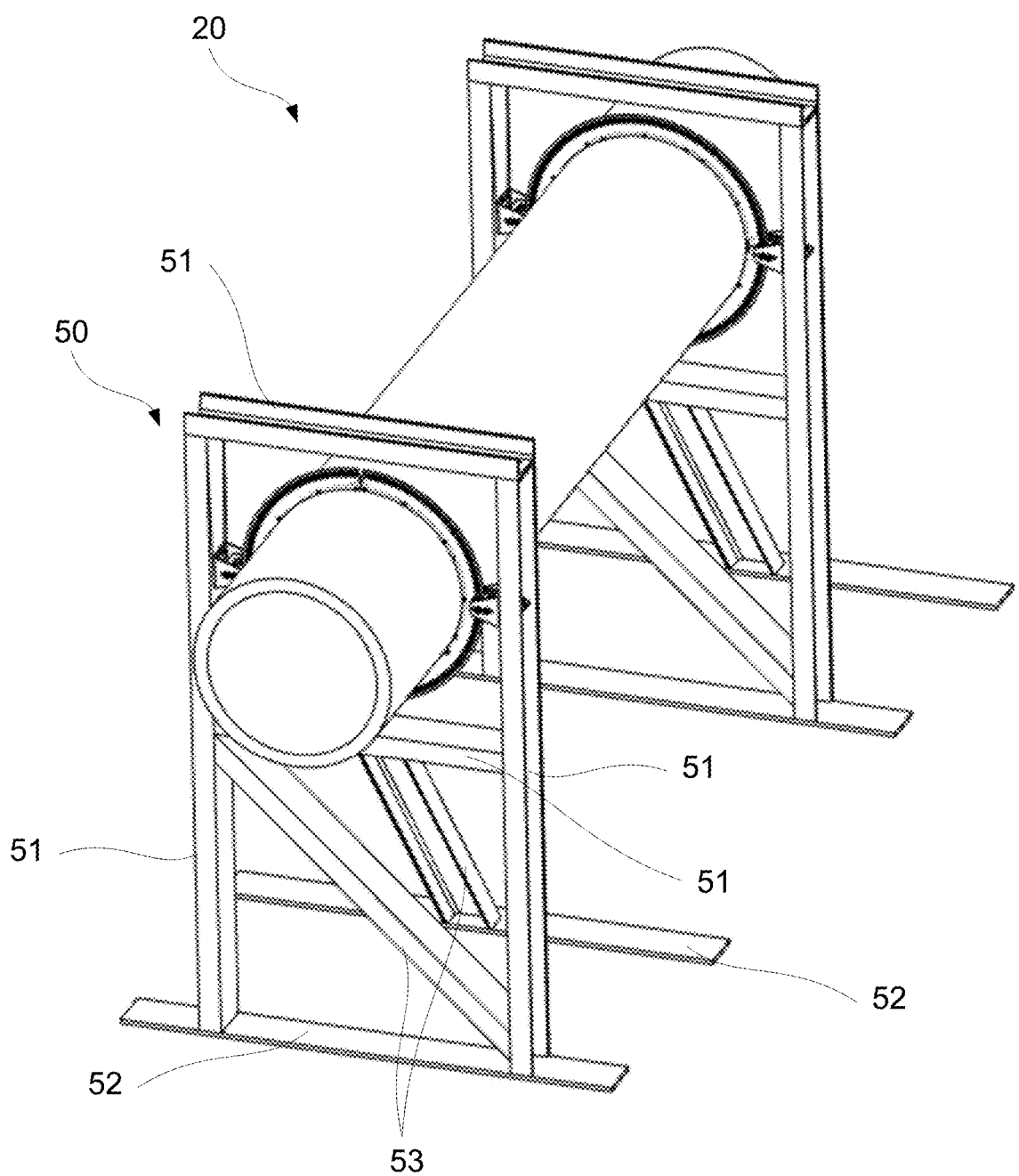
FIG. 5 is a principle drawing of a support structure for the light sensor assemblies according to the disclosure.

Reference is now made to FIG. 5 which is a principle drawing of support structure 50 for the light sensor assemblies 30a-b adapted to position the light sensor assemblies 30a-b in relation to the respective coded disc 21a-b and the drive shaft 11 without any contact with the coded disc 21a-b and drive shaft 11, and which attach the light sensor assemblies 30a-b to an object structure (not shown), such as hull of a vessel or floor of a nacelle, the drive shaft 11 is attached to. The support structure 50 is e.g. formed by framework components 51 forming a mainly rectangular framework enclosing the drive shaft 11 with the coded disc 21a-b by distance and wherein the mainly rectangular framework is provided with at least one foot or base 52 for attachment to the object structure by suitable attachment means (not shown), such as bolts, or by welding. For additional stiffness of the support structure 50, cross-beams 53 may be arranged at suitable positions. For additional support the support structure 50 may be provided with additional reinforcing components (not shown) for attachment to walls or roof of an object structure.

The above described mounting bracket assemblies 40 are adapted for arrangement to the support structure 50 by suitable attachment means, such as bolts 45 and nuts 46, as shown in FIGS. 4A and 4B, enabling fixation of the light sensor assemblies 30a-b to the support structure 50. The support structure 50 will for this be provided with holes or slots (not shown) enabling adjustable arrangement of the mounting bracket assemblies 40 to the support structure 50. If required one or more washers or plates may also be used.

Reference is again made to FIG. 2. As shown, the two coded discs 21a-b are arranged to a suitable section of a drive shaft 11, and wherein the coded discs 21a-b are displaced in longitudinal direction of the drive shaft 11.

Accordingly, the farther towards the ends of the drive shaft 11 section the coded discs 21a-b are arranged, i.e. the longer distance between the coded discs 21a-b there is, the better measurements one get.

If there is a bearing on the drive shaft between the coded discs 21a-b or the drive shaft 11, this requires a small correction of the diameter to achieve correct torque measurements, which then will be to use a calculated average diameter based on taking in shaft spans with different diameter.

The first light sensor assembly 30a of the respective coded disc 21a-b are arranged at the same side of the drive shaft 11, as shown in FIG. 2.

The disclosed embodiments work by that the light source 31 emits a light beam perpendicularly to the coded discs 21a-b, wherein the slots or recesses 22/teeth therein, as the coded discs 21a-b rotate due to the rotation of the drive shaft 11, will result in a pulse modulated light signal to be registered by the electro-optical sensor 32 at the other side of the respective coded disc 21a-b. The electro-optical sensor 32 generates electronic pulses that are transmitted to a processing unit 60 provided with means and/or software for further processing of the electric signal. As shown in FIG. 2 the processing unit 60 will further be provided with a wired or wireless interface for communication with an external device 80 for presentation of data/measurements as well as enabling adjustment of settings/parameters of the processing unit 60. The external device 80 may be a stand-alone device provided with a display or a control system or even a web-service/web-interface.

By using fours sensor assemblies 30a-b as shown, two for each coded disc 21a-b, one will be able to create an array of measurements to enhance the precision. This is especially beneficial to account for slack in shaft bearings.

Accordingly, when the drive shaft 11 rotates this will give a pulse train of switching lights (on/off (on—light, off—dark)). The distance between the slots or recesses 22/teeth in the coded disc 21a-b determines the pulse width, which is a measure in calculation of torsional angle, torque and drive shaft power.

Figure 6:
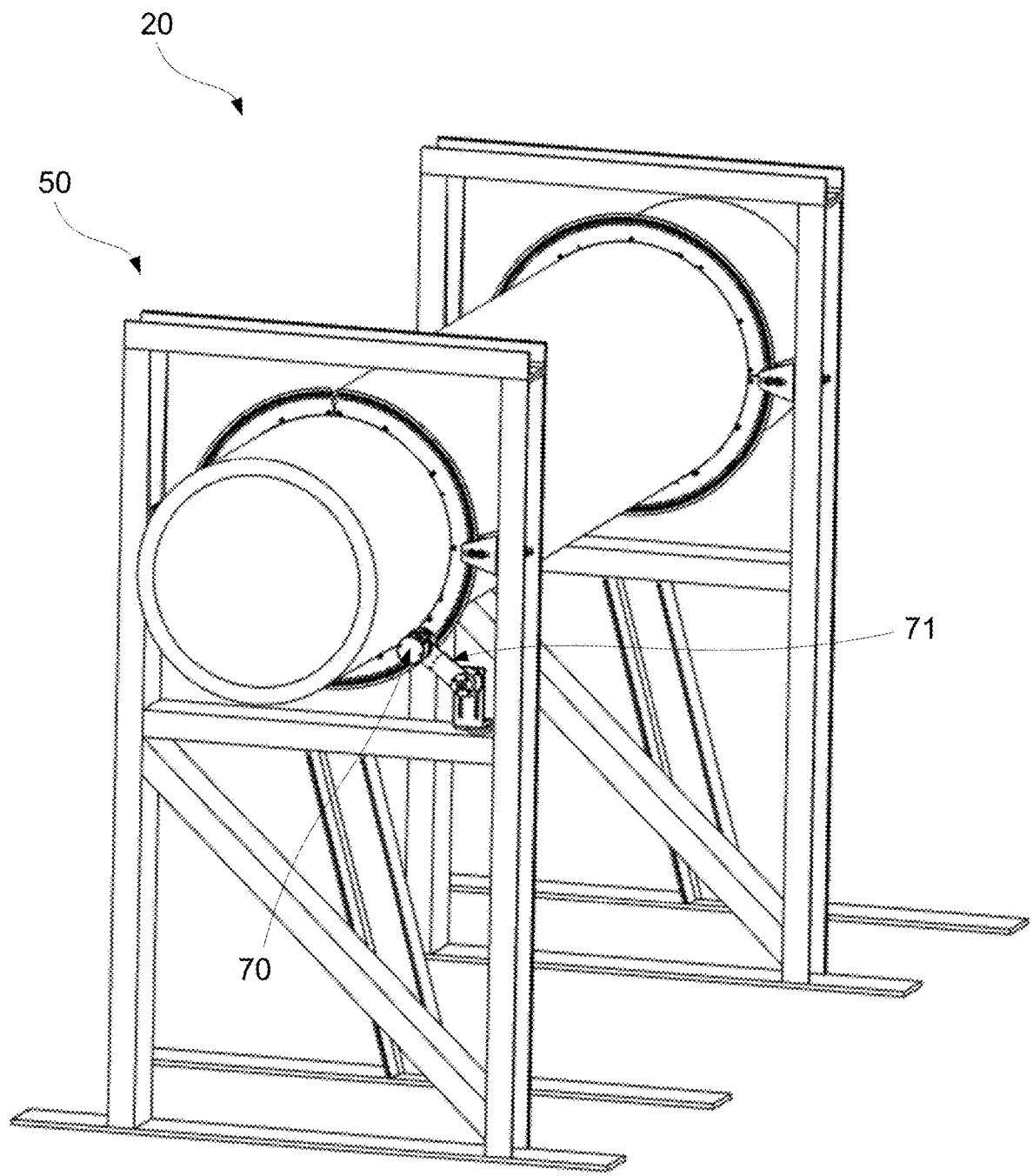
FIG. 6 is a principle drawing of a further embodiment of the drive shaft monitoring system for calibration.

Reference is now made to FIG. 6 showing a principle drawing of further embodiment of the drive shaft monitoring. According a further embodiment of the drive shaft monitoring system 20 it comprises at least one high-resolution incremental encoder 70 (typically 25 000 pulses per revolution of the encoder shaft) arranged in connection with the coded disc 21a-b for calibration purpose. The incremental encoder 70 is arranged with its sensitive measurement axis perpendicular to the slots or recesses 22 of the coded disc 21a-b by attachment to the support structure 50 by appropriate temporary fastening means 71, such as an attachment bracket provided with a magnet. During calibration of the coded disc 21a-b, the incremental encoder 70 will provide a pulse train replacing time-triggered pulses made by an internal clock of the processing unit 60 for calculating slots or recesses 22/teeth offset during calibration. By rotating the drive shaft 11 slowly in both direction the zero point for twist (torque) may be determined.

The incremental encoder 70 is thus used to build up a table in the processing unit 60 containing information of relative position expressed by the fractions ($F_{calibrated\ rising\ pulse\ edge}$ and $F_{calibrated\ falling\ pulse\ edge}$) related to the pulses of the incremental encoder, as described above, that will be used for further processing and monitoring.

The high-resolution incremental encoder 70 is after the calibration is completed removed and disconnected from the drive shaft monitoring system 20.

The processing unit 60 is further provided with means and/or software for calculating current relative positions expressed by the fractions ($F_{current\ falling\ pulse\ edge}$ and $F_{current\ falling\ pulse\ edge}$), and comparing them with the calibrated fractions ($F_{calibrated\ raising\ pulse\ edge}$ and $F_{calibrated\ falling\ pulse\ edge}$, respectively), and further averaging the result for raising and falling pulse edges wherein the result is a measure of the current torsion angle ($\Delta t$), or devAng, which is an expression of rate of loading.

Calculation of RPM is performed by the processing unit 60 by counting clock pulses of one turn of the drive shaft 11, i.e. by measuring the overall speed of slots or recesses 22 of the respective coded disc 21a-b.

The averaged current torsion angle ($\Delta t$), the measured RPM and the knowledge of the steel parameters of the drive shaft 11 make it possible to calculate torque and shaft power, as described above.

Based on the mentioned fractions the processing unit 60 is able to calculate twist and thereby rotation by the formulas described above.

As torque will be calculated for each slot or recesses 22, it is possible to determine torque-oscillations over the revolution.

The drive shaft monitoring system 20 accordingly enables calculation of torque from measuring an angle of twist (deflection) between two points of the drive shaft 11, i.e. the two points defined by the arrangement of the light sensor assemblies 30 and coded discs 21a-b.

It is a fact that the angle of deflection will increase with increased torque. By means of the disclosed embodiments, degree of twist-angle may be displayed on the external device 80 with familiar values as Torque, RPM and Power.

Figure 7A:
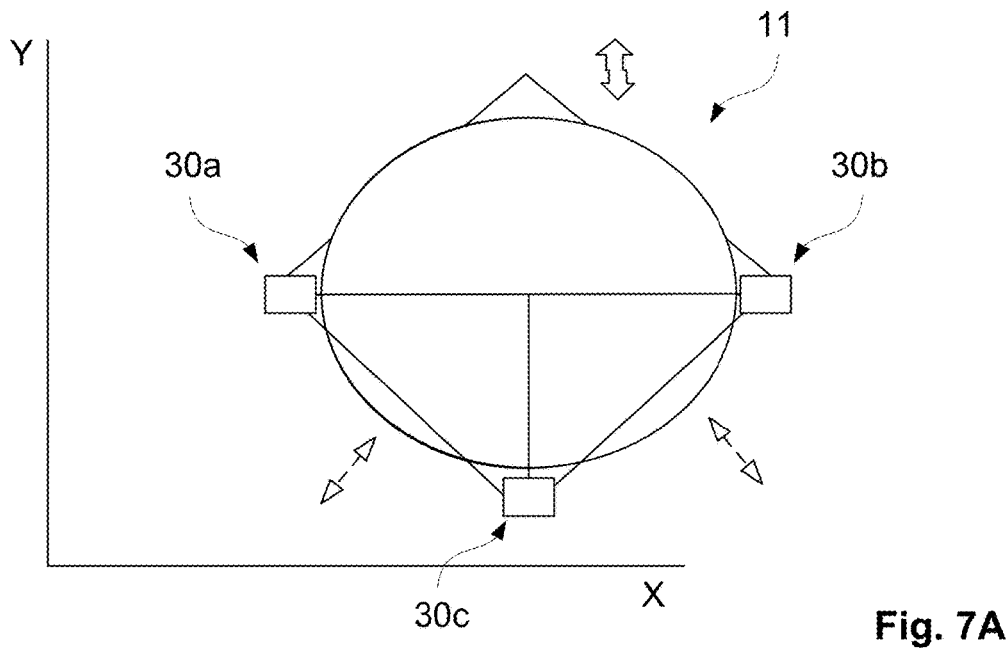
FIGS. 7A-7C are principle drawings of a further embodiment of the drive shaft monitoring system.
Figure 7B:
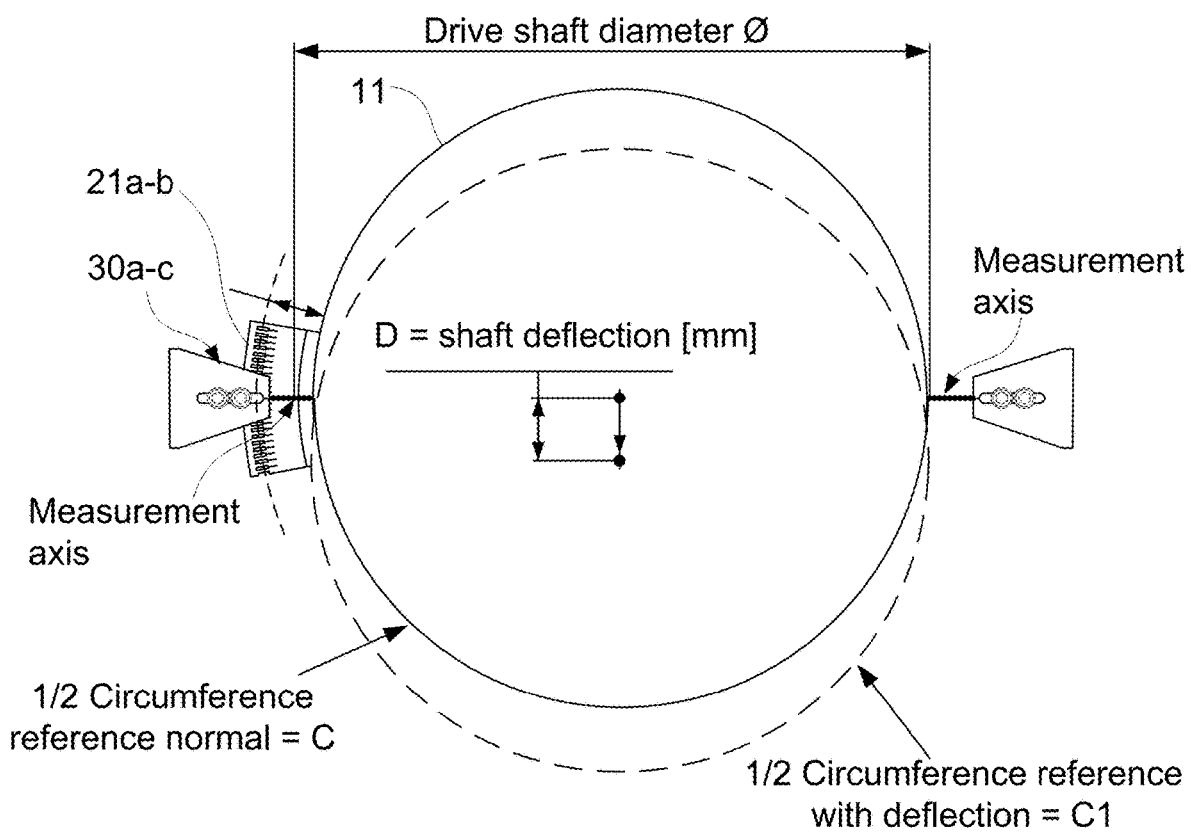
Figure 7C:
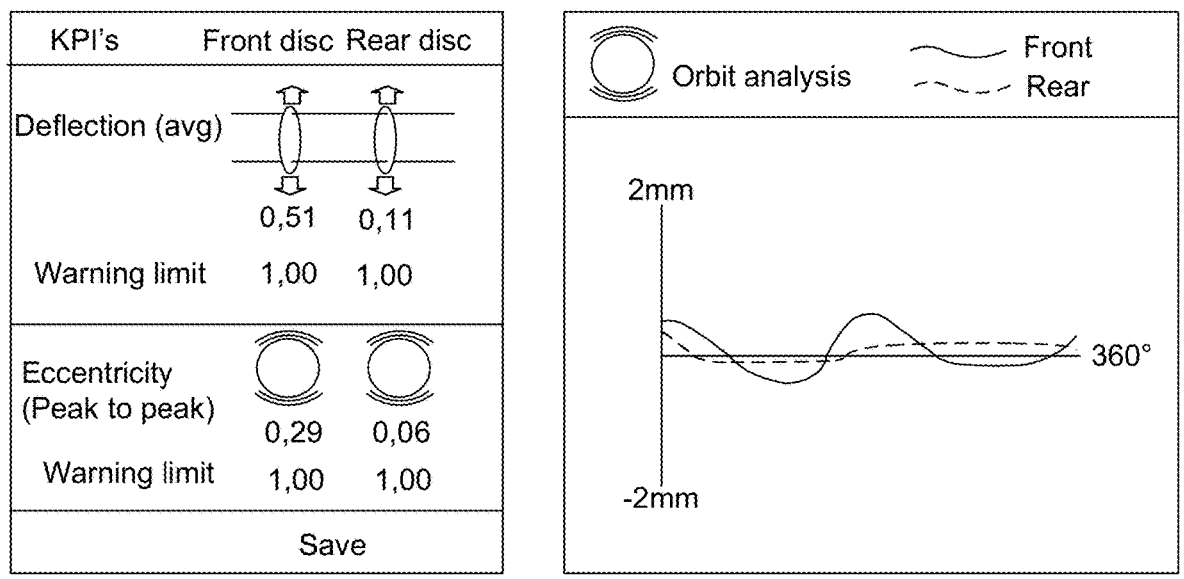

Reference is now made to FIGS. 7A-7C showing principle drawings of a further embodiment.

The inventive embodiments enable, due to comprising at least two independent light sensor assemblies 30a-b arranged to each coded disc 21a-b, measurement of shaft misalignment and eccentricity in Y-axis.

To be able to measure shaft misalignment and eccentricity in X- and Y-plane, the disclosed embodiment comprises the arrangement of a third light sensor assembly 30c positioned between the first 30a and second 30b light sensor assemblies, arranged at 90 degrees from both the first 30a and second 30b light sensor assemblies, for each of the coded discs 21a-b. The third light sensor assembly 30c comprises the same components as the first 30a and second 30b light sensor assemblies and is arranged in the similar manner by a mounting bracket assembly 40 and support structure 50. The third light sensor assembly 30 is arranged to observe the slots or recesses 22 of the coded discs 21a-b with an angle deviating from perpendicular, such as e.g. 30-45 degrees, and in this way enabling detection of longitudinal movement of the drive shaft 11.

By this, orbit deviation may be calculated for each coded disc 21a-b, as shown in FIG. 7C, as described above.

The results may be presented on the external device 80 (see FIG. 2) for a user.

Figure 9:
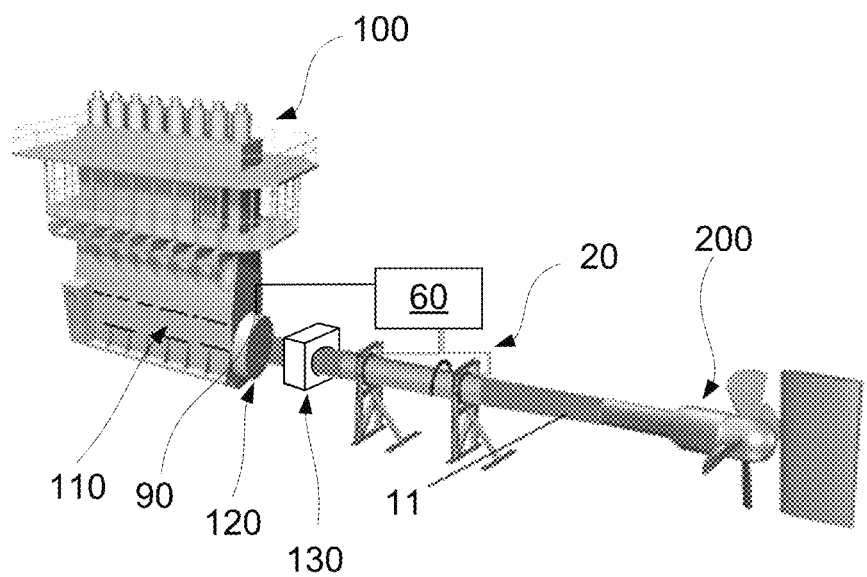
FIG. 9 is a principle drawing of a typical application of the disclosed embodiments.

According to a further embodiment the drive shaft monitoring system 20 in addition is arranged for detecting clutch slip by providing information from an engine flywheel sensor 90 (as shown in FIGS. 2 and 9) to the measurements from the light sensor assemblies 30a-c.

Figure 8:
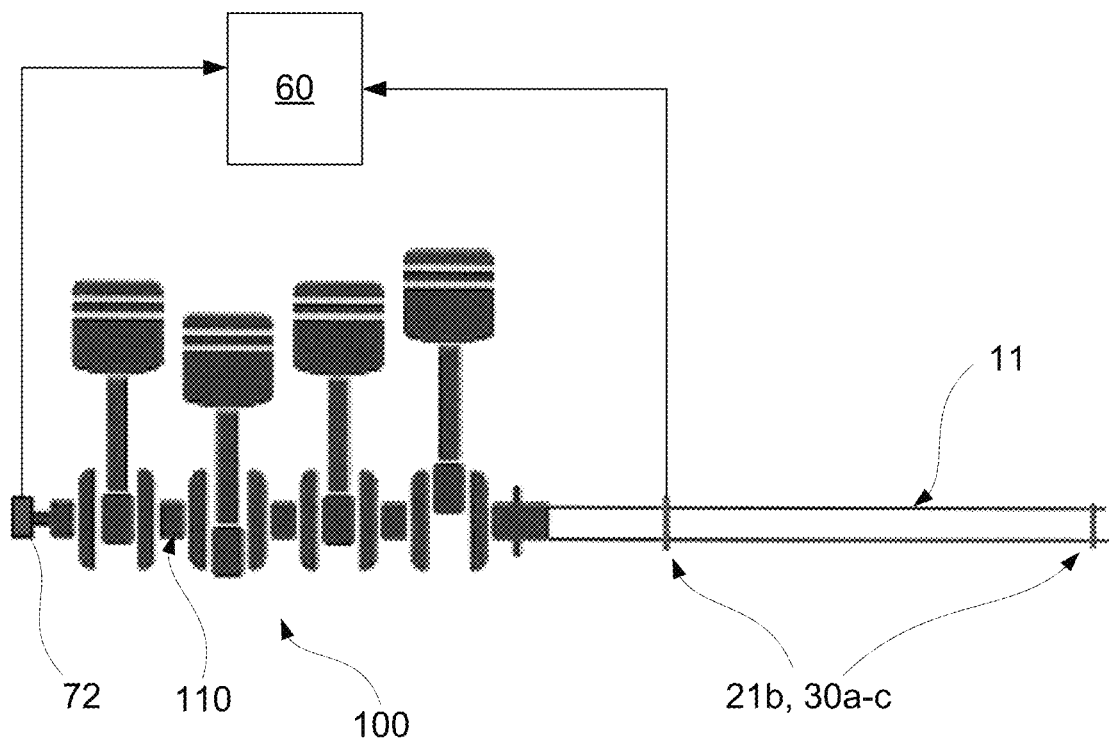
FIG. 8 is a principle drawing of a further embodiment of the drive shaft monitoring system enabling crankshaft monitoring.

Reference is now made to FIG. 8 which is a principle drawing of a further embodiment. According to a further embodiment, the drive shaft monitoring system 20 is arranged for combining the readings from the second (foremost) coded disc 21b with an incremental encoder 72 fixed to the free end of an engine 100 powering the drive shaft 11 for measuring twist/torque and torsional vibrations also over a crankshaft 110 of the engine 100, accordingly providing insight on torsion and oscillations isolated to the engine crankshaft 110. Accordingly, providing a crankshaft monitoring system for the engine 100. Usually it is sufficient that the incremental encoder 72 is a low-resolution incremental encoder, but other encoders may also be used, such as high-resolution encoders.

The incremental encoder 72 will thus work as a third coded disc in the system as regards measurement signals.

This may also be achieved by providing an output of the second (foremost) coded disc 21b to an engine control system for processing, solving the same purpose.

Most large bore diesel engines equipped with an automatic tuning system need a high-resolution crank angle encoder to control combustion timing in the best possible way. This is normally solved by installing an incremental encoder to the centre of the free end of the crankshaft. Resolution may typically be 1080/rotation. For this purpose, standard available incremental encoders may be used.

Due to the length of the crankshaft, it will twist significantly at high load. The assumed twist has to be known to the tuning system in order to calculate correct timing for each cylinder. The load dependent twist at TDC (Top Dead Center), i.e. upper piston position, is calculated and/or confirmed at shop test for each cylinder.

There is however so that once connected to clutch, shaft, gear, generator and propeller, the pattern of torsional vibrations change the behaviour of the engine and the stress applied to the crankshaft. This can be seen in the twist. It is therefore desirable to monitor the twist of the drive shaft in order to:

perform correct tuning of the engines cylinders,
avoid high loads on the crankshaft,
detect operating modes with high torsional vibrations (that should be avoided).

According to a further embodiment, the processing unit 60 or a separate unit is provided with means and/or software for monitoring maintenance of the light sensor assemblies 30a-b. When the assembly is affected by dust or dirt, the relation between light and dark will change. Usually the dirt will lead to less time of light passing through the coded disc 21a-b during one revolution compared to a new and clean system. By measuring the amount of dark and light throughout one revolution it is possible to alert a user of necessary maintenance, i.e. cleaning, of the light sensor assemblies 30a-b, as well as the coded discs 21a-b. This will be crucial for the operating reliability of the optical system, as one without such a health check cannot rely on the measurements/calculations as input to a control unit controlling a motor/engine of a drive shaft system.

A further advantage of the disclosed embodiments is that, due to using at least two independent light sensor assemblies 30a-b per coded disc 21a-b, compensation of the shaft relative position may be performed by combining signals from two sensor assemblies 30a-b situated on each side of the coded disc 21a-b. This is a feature required due to movement of the drive shaft 11 may influence the slot or recess offsets between the two coded discs 21a-b.

In this manner the light sensor assembly 30a may be compensated with measured deviation from light sensor assembly 30b of each of the coded discs 21a-b.

For slot or recesses 22 compensation, the nearest edge with same polarity is used, instead of the torque calculation method where it is the edge between two window edges. Using light sensor assembly 30a as reference, light sensor assembly 30b will measure the deviation from the mapped calibrated relative position. This measured deviation is next used together with the mapped calibrated relative position for light sensor assembly 30b to find the center compensated position of the coded disc 21a-b position.

The disclosed embodiments are applicable to all systems comprising a rotating shaft, but is especially suitable for a rotating drive shaft 11 driving a propeller 200 on a vessel, as shown in FIG. 9 or connected to blades of a wind turbine. As shown in FIG. 9 the drive shaft monitoring system 20 is arranged to a drive shaft 11 connected between an engine 100, which may be a combustion engine or an electric motor, and a propeller 200, wherein the engine 100 drives the propeller 200 via the drive shaft 11. The drive shaft 11 is typically connected to a flywheel 120 of the engine 100 via a gear/gearbox 130 and/or a clutch. There may further be arranged one or more intermediate shafts, bearings, and/or gearbox in the drive train from the engine 100 to the propeller 200. The engine 100 may also be directly connected to the propeller 200 via the drive shaft 11.

The use of at least two independent light sensor assemblies 30a-b for each coded disc 21a-b further provides redundancy in the drive shaft monitoring system by that the drive shaft monitoring system is functional even with only one of the light sensor assemblies working.

Further, by that one uses at least two independent light sensor assemblies 30a-b for each coded disc 21a-b this enables the drive shaft monitoring system to account for slack in shaft-bearings and deflection of hull structure, by using the average value of the measurements.

The disclosed embodiments provide a robust system, wherein all sensitive parts are encapsulated and wherein minimal maintenance is required.

The disclosed embodiments provide a drive shaft monitoring system with high accuracy.

The drive shaft monitoring system provides a system that is almost free of service and capable of operating with stability over a long time due to no mechanical wear.

Disclosed herein is a drive shaft monitoring system that is applicable to small diameter drive shafts as well as large diameter drive shafts.

The drive shaft monitoring system is applicable to drive shafts with low RPM and with high RPM (up to 10 000 RPM).

A drive shaft monitoring system is provided that is robust and mechanically stable (no drifting), and have a large environmental operating temperature range (from 15° C. to +70° C.).

The drive shaft monitoring system is insensitive to centrifugal forces and is not affected by high torque dynamics (slamming and jerks of the drive shaft).

The drive shaft monitoring system is insensitive to electrical fields and radio frequency interference.

The drive shaft monitoring system is easy to install and re-install.

The drive shaft monitoring system is capable of operating both alone and integrated in other control systems.

An alternative to using coded discs with slots or recesses is to provide the coded discs with a light changing pattern on one of the surfaces thereof, such as a barcode, lines, reflective means or similar, and further wherein the light source and electro-optical sensor are arranged at the same side of the coded disc.

The coded discs may further be implemented as gearwheels or rings/discs with vanes.

The invention claimed is:

1. A drive shaft monitoring system (20) for a drive shaft having an exterior surface and extending in a longitudinal direction, comprising:
    a first coded disc (21a) arranged to the exterior surface of the drive shaft (11) at a first position;
    a second coded disc (21b) arranged to the exterior surface of the drive shaft (11) at a second position, the second position being at a predetermined distance from the first coded disc (21a) in the longitudinal direction of the drive shaft (11), the first coded disc (21a) and second coded disc (21b) provided with multiple slots or recesses (22) allowing light to pass through and having a comparable configuration and being evenly distributed in a circumferential direction thereof; and
    at least two independent light sensor assemblies (30a-30c) arranged in connection with the slots or recesses (22) of the first coded disc (21a) and the second coded disc (21b).

2. The drive shaft monitoring system (20) according to claim 1, wherein
    a first light sensor assembly (30a) of the at least two independent light sensor assemblies is arranged at a first circumferential position of the respective coded disc (21a-21b) and a second light sensor assembly (30b) of the at least two independent light sensor assemblies is arranged at a second circumferential position of the respective coded disc (21a-21b), and
    the second circumferential position is at a predetermined distance from the first light sensor assembly (30a) in the circumferential direction of the respective coded disc (21a-21b), such that the first light sensor assembly (30a) and second light sensor assembly (30b) is arranged laterally reversed about the respective coded disc (21a-21b), thereby being aligned on a transversal axis through a center of the respective coded disc (21a-21b).

3. The drive shaft monitoring system according to claim 2, comprising a third light sensor assembly (30c) of the at least two independent light sensor assemblies positioned between the first light sensor assembly (30a) and the second light sensor assembly (30b) in the circumferential direction of the respective coded disc (21a-21b).

4. The drive shaft monitoring system according to claim 2, wherein the light sensor assemblies (30a-30c) comprise a light source (31) emitting a light beam in a plane perpendicular to the multiple slots or recesses (22) at one side of the respective coded disc (21a-21b) and an electro-optical sensor (32) for receiving modulated light through the multiple slots or recesses (22) arranged at the other side of the respective coded disc (21a-21b).

5. The drive shaft monitoring system according to claim 4, comprising a substantially U-shaped sensor holder body (41), wherein
    the light sensor assemblies (30a-30c) are arranged in a mounting bracket assembly (40) formed by the substantially U-shaped sensor holder body (41),
    the light source (31) is arranged at one side of the substantially U-shaped sensor holder body (41),
    the electro-optical sensor (32) is arranged at the other side of the U-shaped sensor holder body (41), accordingly laterally reversed and aligned to a common measurement axis in a transversal direction of the substantially U-shaped sensor holder body (41),
    the U-shaped sensor holder body (41) is adapted to receive an outer part of the coded disc (21a-21b) with a gap therebetween and positioning the light source (31) and electro-optical sensor (32) in correspondence with the slots or recesses (22) of the respective coded disc (21a-21b), allowing the coded disc (21a-21b) to rotate with the slots or recesses (22) in the substantially U-shaped sensor holder body (41) in alignment with the measurement axis of the light sensor assembly (30a-30c).

6. The drive shaft monitoring system (20) according to claim 2, comprising a high-resolution incremental encoder (70) temporarily arranged in connection with the coded discs (21a-21b) configured for use in calibrating of the drive shaft monitoring system (20).

7. The drive shaft monitoring system according to claim 1, comprising a third light sensor assembly (30c) of the at least two independent light sensor assemblies positioned between the first light sensor assembly (30a) and the second light sensor assembly (30b) in the circumferential direction of the respective coded disc (21a-21b).

8. The drive shaft monitoring system according to claim 7, wherein the light sensor assemblies (30a-30c) comprise a light source (31) emitting a light beam in a plane perpendicular to the multiple slots or recesses (22) at one side of the respective coded disc (21a-21b) and an electro-optical sensor (32) for receiving modulated light through the multiple slots or recesses (22) arranged at the other side of the respective coded disc (21a-21b).

9. The drive shaft monitoring system according to claim 8, comprising a substantially U-shaped sensor holder body (41), wherein
the light sensor assemblies (30a-30c) are arranged in a mounting bracket assembly (40) formed by the substantially U-shaped sensor holder body (41), the light source (31) is arranged at one side of the substantially U-shaped sensor holder body (41),
the electro-optical sensor (32) is arranged at the other side of the U-shaped sensor holder body (41), accordingly laterally reversed and aligned to a common measurement axis in a transversal direction of the substantially U-shaped sensor holder body (41),
the U-shaped sensor holder body (41) is adapted to receive an outer part of the coded disc (21a-21b) with a gap therebetween and positioning the light source (31) and electro-optical sensor (32) in correspondence with the slots or recesses (22) of the respective coded disc (21a-21b), allowing the coded disc (21a-21b) to rotate with the slots or recesses (22) in the substantially U-shaped sensor holder body (41) in alignment with the measurement axis of the light sensor assembly (30a-30c).

10. The drive shaft monitoring system (20) according to claim 7, wherein the third light sensor assembly (30c) is arranged to observe the slots or recesses (22) in a non-perpendicular angle.

11. The drive shaft monitoring system according to claim 1, wherein the light sensor assemblies (30a-30c) comprise a light source (31) emitting a light beam in a plane perpendicular to the multiple slots or recesses (22) at one side of the respective coded disc (21a-21b) and an electro-optical sensor (32) for receiving modulated light through the multiple slots or recesses (22) arranged at the other side of the respective coded disc (21a-21b).

12. The drive shaft monitoring system according to claim 11, comprising a substantially U-shaped sensor holder body (41), wherein
the light sensor assemblies (30a-30c) are arranged in a mounting bracket assembly (40) formed by the substantially U-shaped sensor holder body (41),
the light source (31) is arranged at one side of the substantially U-shaped sensor holder body (41),
the electro-optical sensor (32) is arranged at the other side of the U-shaped sensor holder body (41), accordingly laterally reversed and aligned to a common measurement axis in a transversal direction of the substantially U-shaped sensor holder body (41),
the U-shaped sensor holder body (41) is adapted to receive an outer part of the coded disc (21a-21b) with a gap therebetween and positioning the light source (31) and electro-optical sensor (32) in correspondence with the slots or recesses (22) of the respective coded disc (21a-21b), allowing the coded disc (21a-21b) to rotate with the slots or recesses (22) in the substantially U-shaped sensor holder body (41) in alignment with the measurement axis of the light sensor assembly (30a-30c).

13. The drive shaft monitoring system (20) according to claim 12, comprising a support structure (50) positioning the light sensor assemblies (30a-30c) in relation to the respective coded disc (21a-21b) and the drive shaft (11) without any contact with the coded disc (21a-21b) and drive shaft (11), and which attaches the light sensor assemblies (30a-30c) to an object structure the drive shaft (11) is attached to.

14. The drive shaft monitoring system (20) according to claim 12, comprising a high-resolution incremental encoder (70) temporarily arranged in connection with the coded discs (21a-21b) configured for use in calibrating of the drive shaft monitoring system (20).

15. The drive shaft monitoring system (20) according to claim 1, wherein the system (10) is configured to function with a flywheel sensor (90) or configured to function with measurements from an existing flywheel sensor, further comprising a processing unit (60) provided with one or both of means and software for calculating clutch slip.

16. The drive shaft monitoring system (20) according to claim 1, comprising a high-resolution incremental encoder (70) temporarily arranged in connection with the coded discs (21a-21b) configured for use in calibrating of the drive shaft monitoring system (20).

17. The drive shaft monitoring system (20) according to claim 1, comprising an incremental encoder (72) arranged to a free end of an engine (100) powering the drive shaft (11) for combination with readings from a foremost of the coded discs (21b) for measuring twist or torque and torsional vibrations over a crankshaft (110) of the engine (100).

18. The drive shaft monitoring system (20) according to claim 1, wherein the light sensor assemblies (30a-30c) are arranged to a support structure (50) attached to the same object structure as the drive shaft (11).

19. The drive shaft monitoring system (20) according to claim 1, comprising at least one processing unit (60) provided with one or both of means and software for calculating or measuring one or more of revolutions per minute, shaft torsional angle, shaft torque, shaft power, shaft misalignment, and shaft eccentricity.

20. The drive shaft monitoring system (20) according to claim 19, wherein the at least one processing unit (60) is configured for arranging current measurements of the at least two light sensor assemblies (30a-30c) for both coded discs (20a-20b) in fractions for raising pulse edges ($F_{current\ raising\ pulse\ edge}$) and falling pulse edges ($F_{current\ falling\ pulse\ edge}$), and comparing the current fractions with calibrated fractions for raising pulse edge ($F_{calibrated\ raising\ pulse\ edge}$) and falling pulse edges ($F_{calibrated\ falling\ pulse\ edge}$), respectively, and further averaging a result for raising and falling pulse edges, wherein the result is a measure of the shaft torsion angle.

21. The drive shaft monitoring system according to claim 1, wherein the first coding disc and the second coding disc each comprise a reference slot that forms a gap in the multiple slots or recesses that allows passage of light therethrough.

22. A drive shaft monitoring system for monitoring twist or torque of a drive shaft having an exterior surface and extending in a longitudinal direction, comprising:
a first coded disc arranged on the exterior surface of the drive shaft at a first position;
a second coded disc arranged on the exterior surface of the drive shaft at a second position, the second position being at a predetermined distance from the first coded disc in the longitudinal direction of the drive shaft;
the first coded disc comprising first multiple slots or recesses evenly distributed in a circumferential direction with portions of the first coded disc arranged between the first multiple slots or recesses blocking passage of light;

the second coded disc comprising second multiple slots or recesses evenly distributed in a circumferential direction with portions of the second coded disc arranged between the second multiple slots or recesses blocking passage of light the first and second multiple slots or recesses enabling light to pass through and having a same configuration on each of the first and second coded discs;

at least two independent light sensor assemblies arranged in connection with the first slots or recesses of the first coded disc; and at least two other independent light sensor assemblies arranged in connection with the second slots or recesses of the second coded disc.

* * * * *